(12) United States Patent
Kohar et al.

(10) Patent No.: US 6,987,976 B2
(45) Date of Patent: Jan. 17, 2006

(54) METHOD OF PROVIDING POSITION INFORMATION OF MOBILE TERMINALS

(75) Inventors: Handoko Kohar, Eindhoven (NL); Michael Cornelis De Regt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 523 days.

(21) Appl. No.: 10/015,841

(22) Filed: Dec. 10, 2001

(65) Prior Publication Data

US 2002/0086683 A1 Jul. 4, 2002

(30) Foreign Application Priority Data

Dec. 15, 2000 (EP) .................................. 00127591

(51) Int. Cl.
H04Q 7/20 (2006.01)

(52) U.S. Cl. .............................. 455/456.1; 455/456.2; 455/456.6

(58) Field of Classification Search ............. 455/456.1, 455/456.2, 456.6
See application file for complete search history.

(56) References Cited

U.S. PATENT DOCUMENTS

| | | | | |
|---|---|---|---|---|
| 5,926,765 A | 7/1999 | Sasaki | ........................ | 455/456 |
| 6,070,083 A | 5/2000 | Watters et al. | | |
| 6,167,277 A * | 12/2000 | Kawamoto | ................... | 455/457 |
| 6,466,788 B1 * | 10/2002 | Carlsson | .................. | 455/456.1 |

FOREIGN PATENT DOCUMENTS

JP 09178833 7/1997

* cited by examiner

*Primary Examiner*—Joseph Feild
*Assistant Examiner*—Huy D. Nguyen
(74) *Attorney, Agent, or Firm*—Larry Liberchuk

(57) ABSTRACT

A method and system for providing position information of at least first and second mobile terminals, which are part of a mobile network. The mobile network includes a position determining unit to determine the position information of the first mobile terminal, where the first and second mobile terminals are not necessarily communicating with each other. The position determining unit determines the position information of the first mobile terminal, and the mobile network transmits the position information to the second mobile terminal.

15 Claims, 4 Drawing Sheets

METHOD OF PROVIDING POSITION INFORMATION OF MOBILE TERMINALS

Figure 1:
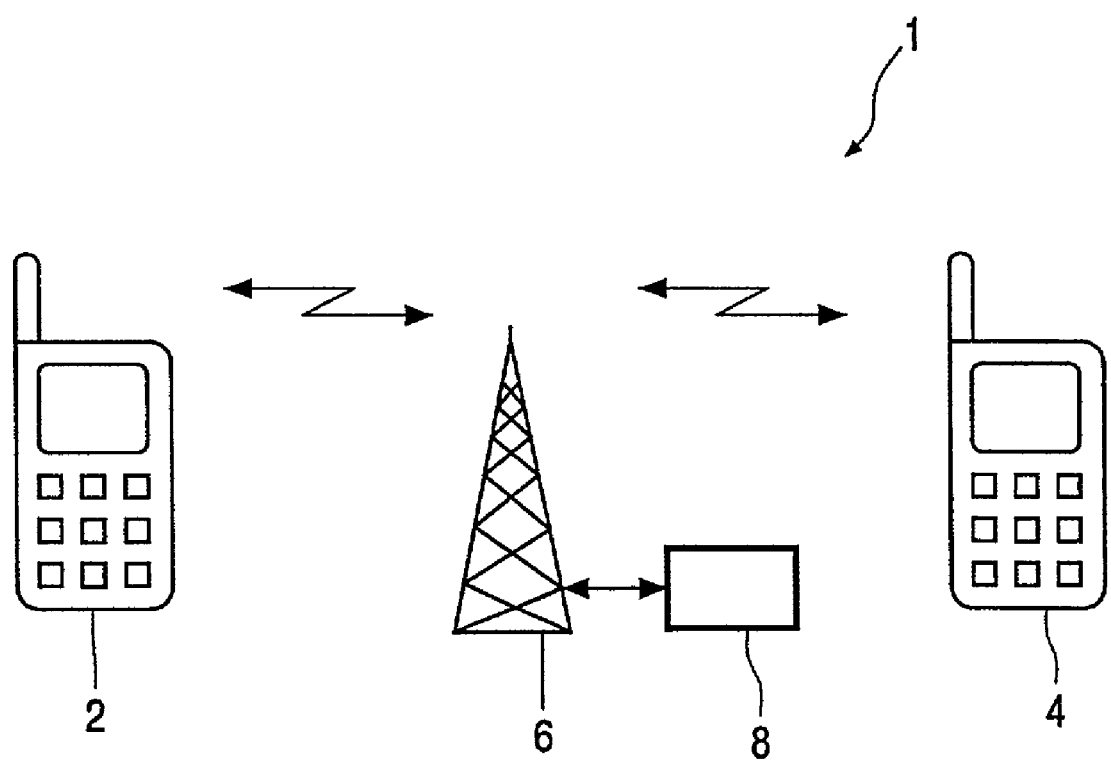
Figure 2:
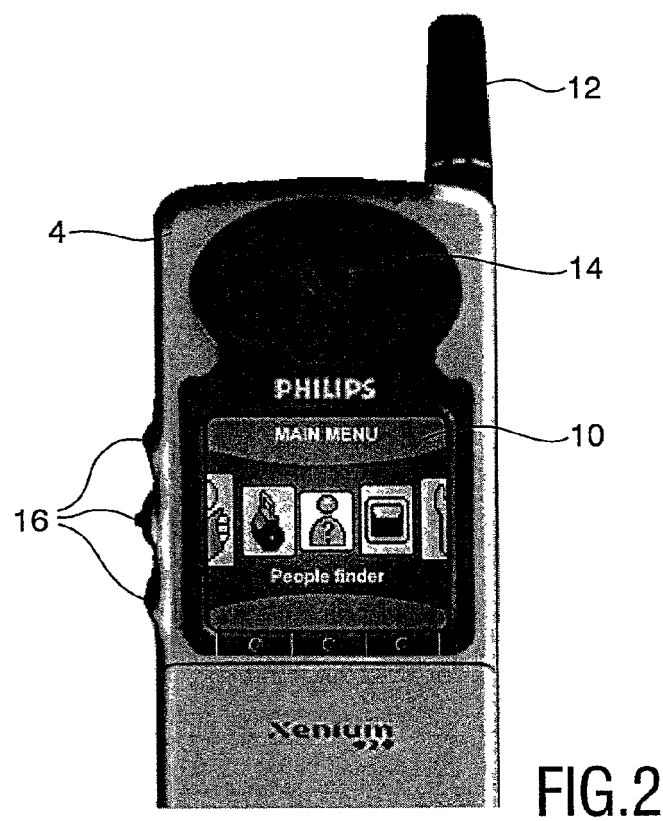

The invention relates to a method of providing position information of at least a first mobile terminal to at least a second mobile terminal, wherein the first and second mobile terminals are part of a mobile network, and wherein the mobile network comprises position determining means to determine the position information of the first mobile terminal.

The invention further relates to a mobile transmission system and to a mobile terminal for use with the method.

A method according to the preamble is known from U.S. Pat. No. 5,926,765. According to this known method the relative position of a first mobile terminal is determined and transmitted to and displayed on a second mobile terminal. However, this is only done when the first and second mobile terminals are communicating with each other.

It is an object of the invention to provide a more useful method of providing position information of at least a first mobile terminal to at least a second mobile terminal. This object is achieved in the method according to the invention, wherein the first and second mobile terminals are not necessarily communicating with each other, the method comprising the steps of:

determining the position information of the first mobile terminal by the position determining means, transmitting the position information by the mobile network to the second mobile terminal.

The invention is based upon the recognition that it may be very useful for a user of a mobile terminal, e.g. a mobile phone or a cellular phone or a mobile radio or a handheld computer/personal digital assistant with wireless communication capabilities, to be able to locate and/or track other users of such mobile terminals also when there is no communication between these mobile terminals. For instance, it might happen that a user of a mobile phone is shopping in a shopping center or the like and he/she would like to drink a cup of coffee with one or several of his/her friends who also have a mobile phone. In such a case the user may use the method according to the invention to find out, without making any phone call to the friends, whether there are any friends in the neighborhood. If so, the user is also able to locate them so that he/she can go to them to invite them to have a cup of coffee with him/her. In a different application of the method according to the invention, parents can track the whereabouts of their children (provided that one or both parents and the children are equipped with a mobile terminal).

In an embodiment of the method according to the invention the first and second mobile terminals are subscribed to a position information providing service offered by the mobile network. By offering such a desirable position information providing service to the users of the mobile terminals an operator of the mobile network can generate additional turnover/income. The subscription could be based on a fixed monthly fee or on a fee which is charged for each time that use is made of the service.

In an embodiment of the method according to the invention the position information is determined and transmitted at the second mobile terminal's request. The position information of a mobile terminal may be continuously determined and transmitted to the other mobile terminals. However, a user of a mobile terminal will not always be interested in the position information of other mobile terminals. According to the present embodiment the position information of a certain mobile terminal is only determined and transmitted at another mobile terminal's request. In this way the resources of the mobile network are used more efficiently.

In a further embodiment of the method according to the invention the second mobile terminal comprises a database with entries for mobile terminals, wherein the second mobile terminal is arranged for requesting the position information for at least part of the mobile terminals included in the database. A user of a mobile terminal is most likely only interested in the position information of only a few other users of mobile terminals. By means of the database, which could be (part of) a phonebook or an address book or the like, the user of the mobile terminal can conveniently store entries for the mobile terminals for which he/she is interested in receiving the corresponding position information. Furthermore, with this database the user can easily select one or several mobile terminals and request the corresponding position information.

In an embodiment of the method according to the invention the position information comprises the absolute position of the first mobile terminal. This absolute position, which might be in an appropriate format, can then be displayed on a display of the mobile terminal or be output via a spoken message.

In another embodiment of the method according to the invention the second mobile terminal comprises a compass or a GPS-receiver for providing further position information of the second mobile terminal, wherein the second mobile terminal comprises means for determining the relative position of the first mobile terminal with respect to the second mobile terminal from the position information and the further position information.

By combining the absolute position of the first mobile terminal with the further position information of the second mobile terminal it is possible to determine the relative position of the first mobile terminal with respect to the position of the second mobile terminal. This relative position, which might for instance indicate that the first mobile terminal is 300 meters to the south-west of the second mobile terminal, can then be displayed on a display of the second mobile terminal.

Alternatively, according to yet another embodiment of the method according to the invention, the position information comprises the relative position of the first mobile terminal with respect to the second mobile terminal. The mobile network is able to determine the position information of the first and second mobile terminals and to determine from this the relative position of the first mobile terminal with respect to the position of the second mobile terminal. This relative position can then be transmitted to the second mobile terminal. This has the advantage that the second mobile terminal does not need to have a compass or a GPS-receiver for providing the further position information, nor does the second mobile terminal need to have the means for determining the relative position of the first mobile terminal with respect to the second mobile terminal.

The above object and features of the present invention will be more apparent from the following description of the preferred embodiments with reference to the drawings, wherein:

FIG. 1 shows a block diagram of an embodiment of the mobile transmission system according to the invention, FIGS. 2 to 7 show the upper part of a mobile phone by means of which the method according to the invention will be described.

In the Figures, identical parts are provided with the same reference numbers.

The mobile transmission system 1 according to FIG. 1 comprises a mobile network 6 with at least a first mobile terminal 2 and a second mobile terminal 4. In FIG. 1 the mobile network 6 is a mobile phone network and the mobile terminals 2 and 4 are mobile phones. The mobile network 6 as shown comprises a single base station. However, in general the mobile network 6 may comprise a plurality of interconnected base stations. The mobile network 6 comprises position determining means 8 to determine a position information of the first mobile terminal 2. In general more than two mobile terminals will be included in the system and the position determining means 8 will be able to determine the position of all these mobile terminals. Several methods of determining the position of a mobile terminal are known, see for example in said US patent. The position determining means 8 may determine the position of the first mobile terminal at any time, i.e. when the mobile terminals 2 and 4 are communicating with each other but also when the mobile terminals 2 and 4 are not communicating with each other. Thereafter, this position information is transmitted by the mobile network 6 to the second mobile terminal 4.

An operator of the mobile network 6 may enable the users of the mobile terminals 2 and 4 to obtain position information of other mobile terminals by offering a position information providing service to which the users may subscribe. The position information may be determined and transmitted continuously or at the second mobile terminal's 4 request. The mobile terminals 2 and 4 may comprise a database, e.g. a phonebook or an address book, with entries for mobile terminals and the mobile terminals 2 and 4 may be arranged for requesting the position information for at least part of the mobile terminals included in this database.

FIGS. 2 to 7 show the upper part of a mobile phone 4 by means of which the method according to the invention will be described. The mobile phone 4 is a mobile terminal for use in the method and system of the invention. The mobile phone 4 comprises a display 10, an antenna 12, a loudspeaker 14 and buttons 16. The mobile phone 4 may also comprise a keyboard (not shown) and a microphone (not shown). In the display 10 a graphical user interface is displayed. The graphical user interface comprises a carousel of icons, wherein the icon that is in the center of the display can be selected. A user can operate the carousel, i.e. move the icons to the left or to the right, by means of the upper and lower buttons 16. The icons represent functions of the mobile phone and a desired function can be selected by means of selecting the corresponding icon. The user can select the desired peoplefinder function by means of one of the buttons 16. The peoplefinder function will enable the user to locate or track other mobile phones.

Figure 3:
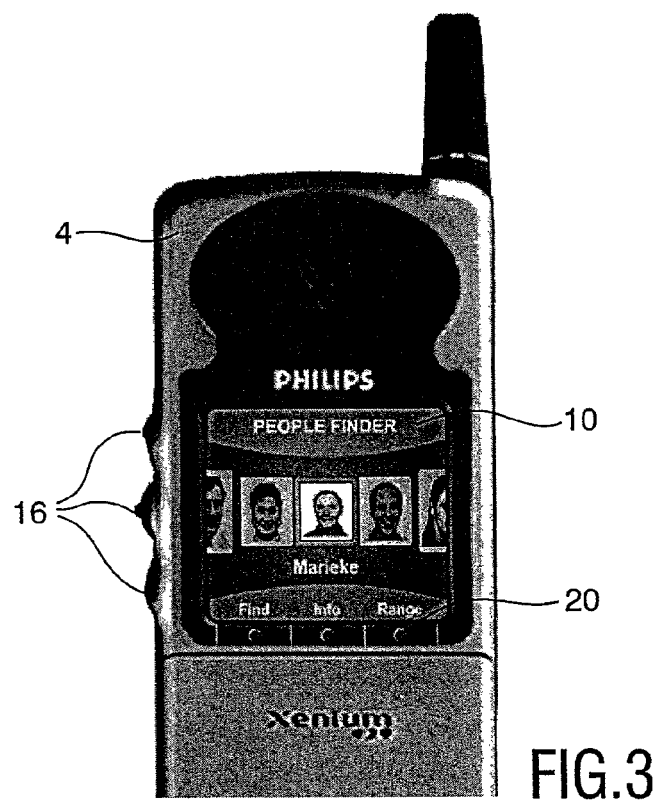
Figure 4:
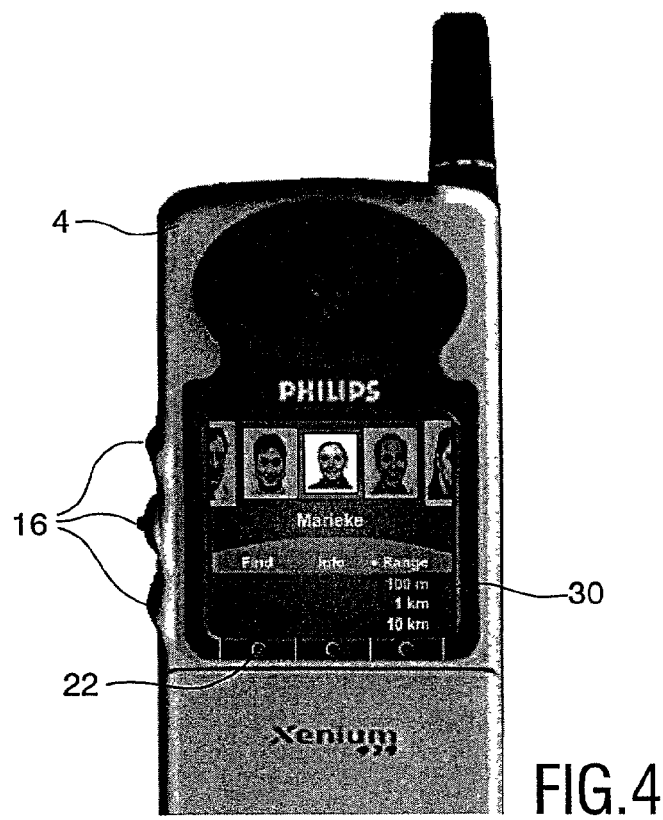
Figure 5:
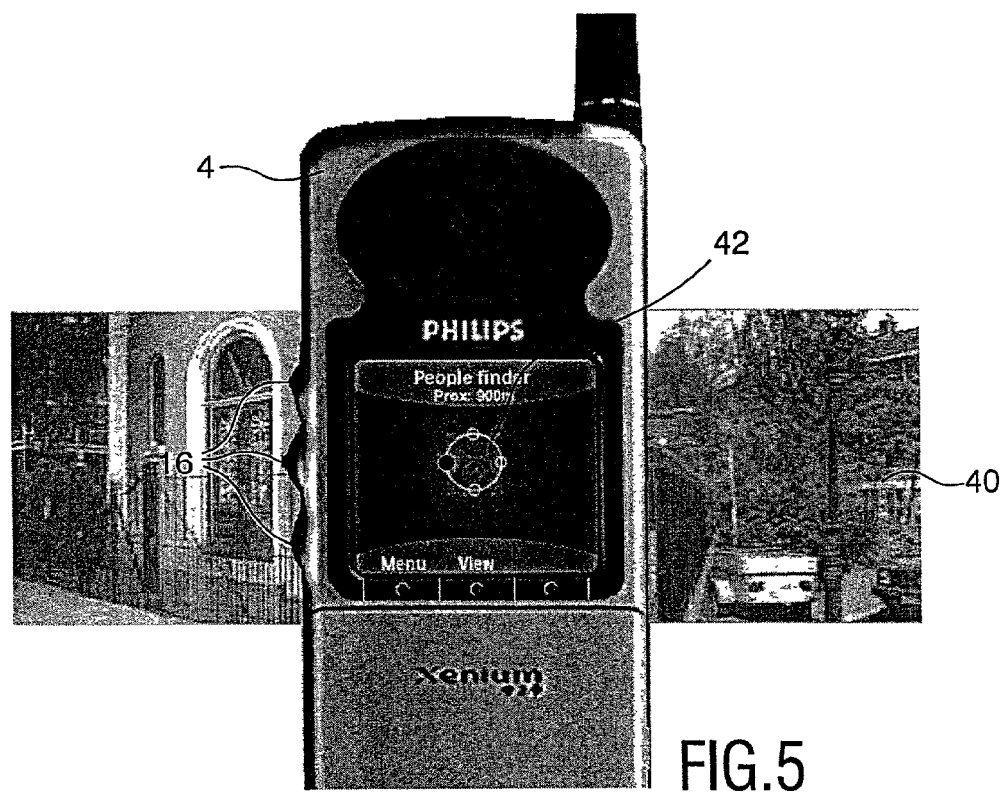
Figure 6:
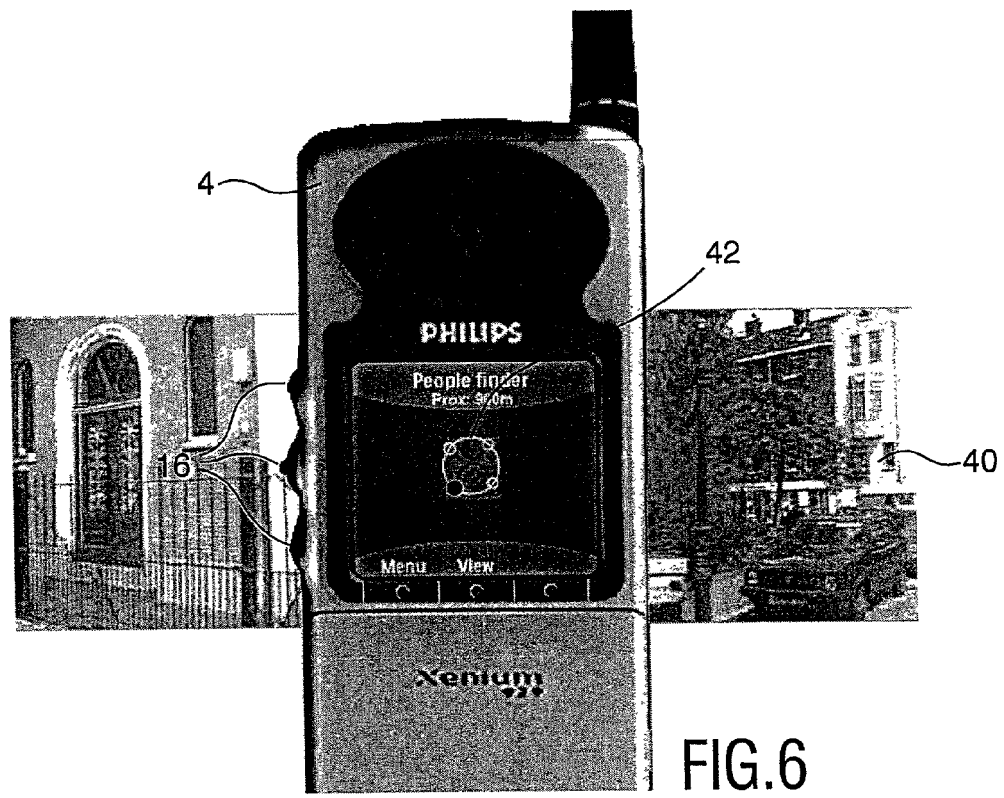
Figure 7:
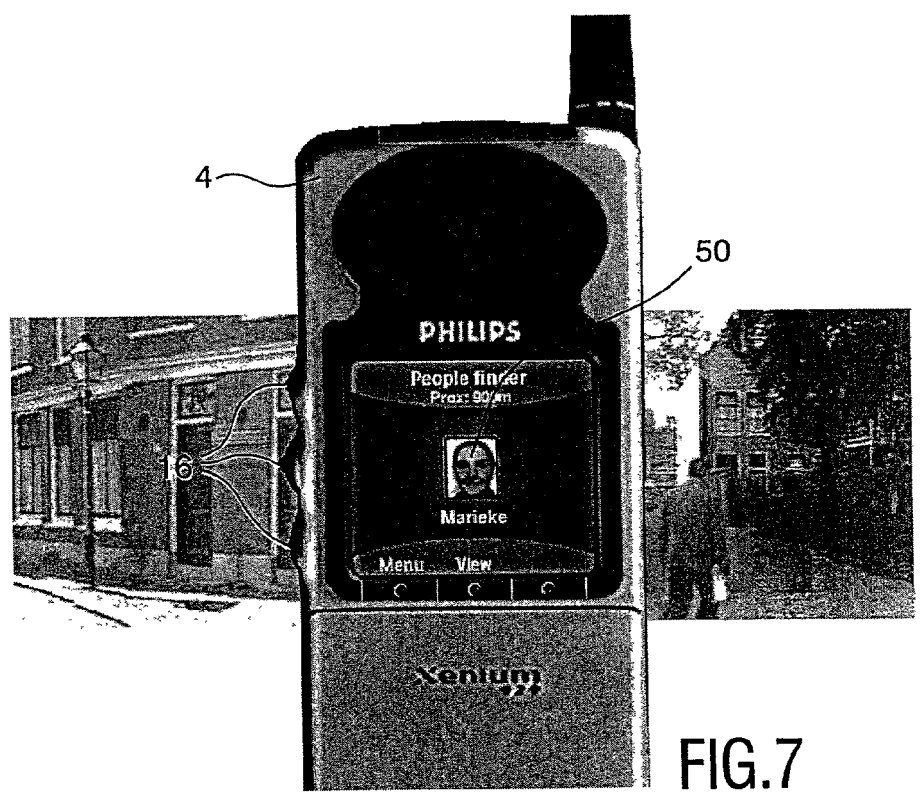

FIG. 3 shows the display of the mobile phone 4 after the peoplefinder function has been selected. Again, a carousel of icons is displayed in the display 10. This time the icons represent other mobile phone users for which entries are present in a database. The database is included in the mobile phone 4 and may be an extended phone book in which not only name and phone number of a user is entered but also a portrait of the user. These portraits are used as icons in FIG. 3. The user of the mobile phone 4 may browse through the carousel of icons and select a specific user of another mobile phone by means of the buttons 16. In FIG. 3 the user "Marieke" is selected to be located. A softkey 20 labeled "Range" is provided to see which of the users of the other mobile phones which have been entered in the database are nearby. After pressing this softkey 20 a range selection menu 30 is displayed as is shown in FIG. 4. By means of the buttons 16 the user can select a range of 100 meters, 1 kilometer or 10 kilometer. After selection of one of these ranges, say 1 kilometer, again the carousel of user icons as shown in FIG. 3 is displayed. In this case, however, all user icons which correspond to mobile phones which are within the specified range of 1 kilometer from the mobile phone 4 are highlighted so that the user of the mobile phone 4 can easily identify the persons within the specified range. The user of the mobile phone 4 may decide to find out where a specific other user, e.g. Marieke, is located. By pressing the softkey 22 the user can activate this function and on the display 10 a positioning circle 42 is displayed as is shown in FIG. 5. For reference purposes a possible background environment 40 as seen by the user of the mobile phone 4 (when holding the mobile phone in a vertical position in front of the user) is shown in this FIG. 5. The positioning circle 42 comprises 4 dots, the darkest one of which indicates the position of the mobile phone of Marieke. From this it is clear that the mobile phone of Marieke is located about 90 degrees to the left of the user of the mobile phone 4. Furthermore, it is displayed that the mobile phone of Marieke is approximately 900 meters away from the mobile phone 4. When the user rotates the mobile phone 4 to the right as is shown in FIG. 6 the dot indicating the position of the mobile phone of Marieke will rotate to the left on the positioning circle 42. By moving to the right the dot indicating the position of the mobile phone of Marieke will move towards the center top of the positioning circle 42. When the mobile phone 4 is directed towards the mobile phone of Marieke the portrait 50 of Marieke is displayed in the center of display 10 (see FIG. 7) and the user knows the relative position of the mobile phone of Marieke: 900 meters in the direction in which the mobile phone 4 is held.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A method of providing position information of at least a first mobile terminal and at least a second mobile terminal, wherein a network comprises position determining means to determine the position information of the first mobile terminal, wherein the first and second mobile terminals are not necessarily communicating with each other, the method comprising:

determining the position information of the first mobile terminal by the position determining means, and transmitting the position information by the network to the second mobile terminal; wherein the position information comprises position of the first mobile terminal, and wherein the second mobile terminal comprises a compass or a GPS-receiver for providing further position information of the second mobile terminal, and wherein the second mobile terminal comprises means for determining position of the first mobile terminal with respect to the second mobile terminal from the position information and the further position information.

2. The method according to claim 1, wherein the first and second mobile terminals are subscribed to a position information providing service offered by the network.

3. The method according to claim 1, wherein the position information is determined and transmitted at the second mobile terminal's request.

4. The method according to claim 1, wherein the second mobile terminal comprises a database with entries for mobile terminals, and wherein the second mobile terminal is arranged for requesting the position information for at least part of the mobile terminals included in the database.

5. The method according to claim 1, wherein the position information comprises position of the first mobile terminal with respect to the second mobile terminal.

6. A transmission system comprising:
at least a first mobile terminal;
at least a second mobile terminal; and
a network having position determining means to determine a position information of the first mobile terminal;
wherein the first and second mobile terminals are not necessarily communicating with each other, and wherein the position information is transmitted by the network to the second mobile terminal; wherein the second mobile terminal comprises a compass or a Gps-receiver for providing further position information of the second mobile terminal, and wherein the second mobile terminal comprises means for determining position of the first mobile terminal with respect to the second mobile terminal from the position information and the further position information.

7. The transmission system according to claim 6, wherein the first and second mobile terminals are subscribed to a position information providing service offered by the network.

8. The transmission system according to claim 6, wherein the position information is determined and transmitted at the second mobile terminal's request.

9. The transmission system according to claim 6, wherein the second mobile terminal comprises a database with entries for mobile terminals, and wherein the second mobile terminal is arranged for requesting the position information for at least part of the mobile terminals included in the database.

10. The transmission system according to claim 6, wherein the position information comprises position of the first mobile terminal with respect to the second mobile terminal.

11. A mobile terminal for conducting communications over a network, wherein the mobile terminal is arranged for receiving a position information of at least one other mobile terminal from the network, said position information being determined by a position determining means of the network, and wherein the mobile terminal is not necessarily communicating with the at least one other mobile terminal; wherein the mobile terminal further comprising a compass or a Gps-receiver for providing further position information of the mobile terminal, and means for determining position of the at least one other mobile terminal with respect to the mobile terminal from the position information and the further position information.

12. The mobile terminal according to claim 11, wherein the mobile terminal and the at least on other mobile terminal are subscribed to a position information providing service offered by the network.

13. The mobile terminal according to claim 11, wherein the position information is determined and transmitted at the mobile terminal's request.

14. The mobile terminal according to claim 11, wherein the mobile terminal comprises a database with entries for mobile terminals, and wherein the mobile terminal is arranged for requesting the position intonation for at least part of the mobile terminals included in the database.

15. The mobile terminal according to claim 11, wherein the position information comprises position of the at least one other mobile terminal with respect to the mobile terminal.

* * * * *